May 23, 1933. C. J. HALBORG 1,910,388
EQUALIZING HEAD FOR BROACHING MACHINES
Filed March 19, 1930
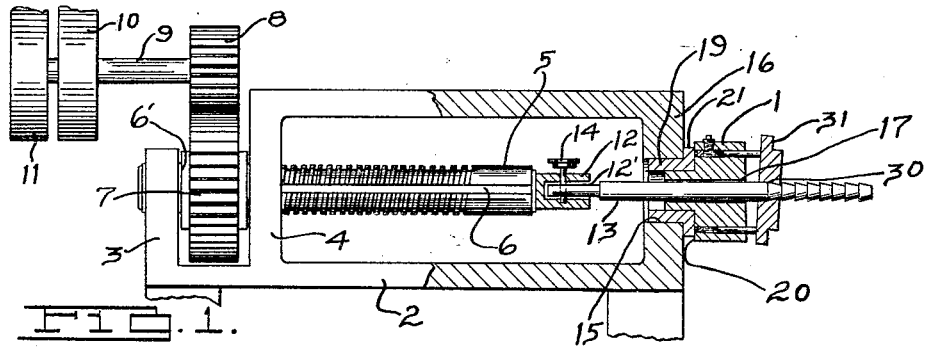
INVENTOR
Carl J. Halborg.
BY
Harness, Dickey, Pierce & Dann
ATTORNEYS.

Patented May 23, 1933

1,910,388

UNITED STATES PATENT OFFICE

CARL J. HALBORG, OF DETROIT, MICHIGAN, ASSIGNOR TO COLONIAL TOOL COMPANY, A CORPORATION OF MICHIGAN

EQUALIZING HEAD FOR BROACHING MACHINES

Application filed March 19, 1930. Serial No. 436,979.

This invention relates to broaching machine work supporting heads.

Heretofore, the heads of broaching machines have not been able to retain the passages through which the broaching tool is moved in alignment with the path of the tool without providing the work with at least one finished surface in a related position to the course of the passage. As a result, machining of articles which otherwise could have been used in an unfinished condition has been necessary to prevent breaking of the broaching tool. Frequently the passage of the work through which the tool is moved is not exactly true and in that event, even the provision of a machined reference surface on the side of the work which engages a non-yieldable work supporting head will not allow the tool to follow the course of the passage.

The main objects of this invention are to provide an improved head for a broaching machine; to provide an improved work support on a broaching machine which will permit the work to shift in position under the action of the broaching tool so as to cause the broaching tool to follow the course of the apertures through which the tool is moved, thereby protecting the tool from lateral flexure and ultimate failure; to provide yieldable means on a work support of this kind against which an irregular, unfinished surface of a piece of work may be engaged without positioning the passage in the work out of alignment with the path of the broaching tool during operation; and to provide hydraulic means for equally distributing the resisting forces which normally secure the work against movement with the tool regardless of the position into which the work is moved by the action of the tool.

An illustrative embodiment of my invention is shown in the accompanying drawing, in which:

Fig. 1 is a side elevation, partly in section, of a broaching machine embodying my improved work supporting head.

Fig. 2 is an enlarged central section of my improved work supporting head.

Fig. 3 is a vertical section taken on the line 3—3 of Fig. 2.

Fig. 4 is a vertical section taken on the line 4—4 of Fig. 2.

Fig. 5 is a vertical section of a broaching machine head showing the manner in which a piece of work is supported.

Fig. 6 is a section, similar to Fig. 5, showing the work in a changed position.

In the form shown, my improved work supporting head 1 is illustrated in connection with a broaching machine which may be of any conventional construction but is shown as comprising a frame 2 having upright posts 3 and 4 on which a worm-threaded member 5 is shiftably mounted. The member 5 has a longitudinal groove 6 in its outer periphery into which lugs on the posts 3 and 4 seat for securing the threaded member against rotation. Located between the posts 3 and 4 and threaded on the member 5 is a nut 6' which has gear teeth 7 on its outer periphery. The teeth 7 of the nut 6' mesh with the teeth of a pinion 8 which is carried by a shaft 9 on which a driving pulley 10 and an idler pulley 11 are mounted.

The front end 12 of the threaded member 5 is provided with a slot 12' for receiving the shank end of a broaching tool 13 which may be secured against displacement from the slot by a key 14. The broaching tool extends through an aperture 15 in the front wall 16 of the frame 2 as shown in Fig. 1.

With the above construction, rotation of the nut 6' by the pinion 8 drives the threaded member 5 to the left as viewed in Fig. 1, carrying with it the broaching tool 13. It is understood that hydraulic or other suitable means may be employed in place of the worm and nut structure shown.

The work supporting head 1 is formed of a substantially cylindrical block having a central passage 17 for receiving the broaching tool 13, an inner portion 18 of reduced diameter which is seated within a collar 19 and an outer portion having a shoulder 20 which bears against a peripheral end flange 21 on the collar 19 located between the shoulder 20 and the outer surface of the wall 16.

Formed in the outer portion of the head 1 between the inner and outer peripheries thereof are spaced apertures 22 which extend axially of the head. An annular groove 23 provided in the shoulder 20 in communication with the apertures 22 and the outer extremity of the groove 23 is sealed by a ring 24 welded in position as at 24' thereby providing an annular passage 25 which communicates with the inner end of each of the apertures 22. A filling inlet 26 is formed in the outer periphery of the head 1 and is normally closed by a plug 27.

In the illustration shown, there are four apertures 22, each located ninety degrees apart and having carefully machined walls. Slidably mounted in the apertures 22 are pins or pistons 28 having machined peripheries which form fluid tight seals in conjunction with the machined walls of the apertures 22. The interior part of the apertures 22 and the passage 25 are filled with a fluid such as oil through the inlet 26. Before the plug 27 is replaced after the filling operation, the pins 28 are urged inwardly so as to remove all pocketed air from the interior of the apertures and from the passage 25. Sufficient oil is provided to cause the outer ends of the pins 28 to protrude the face 29 of the head. The fluid forms a substantially continuous connecting medium between the inner ends of the pins 28 supporting them in an extended position.

In operation, the broaching tool 13 is removed from the slotted end 12 of the member 5 by pulling the key 14 and the shank end of the tool is inserted through an aperture 30 in a piece of work 31. The shank end of the tool 13 is then again connected with the member 5 and the tool 13 together with the work are drawn rearwardly by the action of the member 5. When the work 31 engages the outer extremities of the pins 28 its movement in the direction of the stroke of the tool 13 is arrested by the pins. The pins are yieldably supported by the fluid medium in the passage 25 so that the work may be tilted as illustrated in Figs. 1, 5 and 6 by the action of the tool as it is drawn through the aperture 30.

This tilting action allows the tool to position the work so that the tool 13 follows the course of the aperture 30 without subjecting the tool to lateral flexure and the shank end of the tool is loosely engaged in the slot 12' of the member 5 so that the work may be inclined at a substantial angle to the axis of movement of the member 5 without endangering the tool.

With my improved work support head, it is unnecessary to finish any of the surfaces of the work for the shiftable pins 28 are adapted to move relative to each other so as to accommodate pieces of work having substantially rough and irregular surfaces. When one or more of the pins 28 are urged inwardly by the work the fluid in the passage 25 and inner ends of the apertures 22 forces the other pins outwardly a corresponding amount. In this manner the pressure exerted by the pins is equalized and the work is free to wabble or adjust itself under the action of the tool.

Although but one specific embodiment of my invention is herein shown and described, it will be understood that numerous details of the construction shown may be altered or omitted without departing from the spirit of this invention, as defined by the following claims.

What I claim is:

1. In a broaching machine, a work support head having a passage therethrough for admitting a broaching tool, variable members slidably mounted on said head and circumferentially spaced about said passage having protruding ends for engaging a piece of work so as to resist movement thereof in the direction of movement of the broaching tool, and means co-acting with all of said members for equalizing the resisting forces thereof and adapted to permit all of said members to assume respectively different positions under the action of said tool so as to guide said work during the movement of said tool through an aperture therein.

2. In a broaching machine, a work support head having a passage for receiving a broaching tool and having a plurality of spaced apertures circumferentially spaced about said passage and communicating with each other at their inner ends, pins slidably mounted in the outer portions of said apertures having substantially liquid tight seals with the walls thereof and normally protruding from said head in a direction opposite to the direction of the working stroke of said tool, for securing a piece of work against movement in the direction of said working stroke, and a liquid in the inner ends of said apertures forming a continuous movable medium for allowing said pins to assume respectively different positions under the action of said tool upon said work so as to guide said work during the movement of said tool through an aperture in said work.

3. In a broaching machine including a supporting structure having an opening therein, a work supporting head extending into said opening having a plurality of circumferentially spaced apertures in one end, a shoulder intermediate the ends of said head having a groove communicating with the inner ends of said apertures, means in the open side of said groove abutting said structure and forming a liquid tight seal at the outer extremity of said groove, a plurality of pistons, one slidably mounted in the outer portions of each of said apertures for resisting axial movement of a piece of work by the tool of said machine, and a continuous mobile medium in the inner parts of said apertures and in said groove for equalizing the resisting forces of said pistons and allowing relative movement thereof during operation of said tool so as to prevent breaking thereof.

4. In a broaching machine, a head having a passage therethrough for receiving a broaching tool, a plurality of pistons circumferentially arranged about said passage and slidably mounted in said head for securing a piece of work against movement in the direction of the stroke of the broaching tool of said machine, and means co-acting with the inner ends of said pistons for equalizing the resisting forces thereof during relative movement of said pistons.

5. In a broaching machine, a head having a passage for receiving a broaching tool, a plurality of pistons surrounding said passage and slidably mounted in said head adapted to protrude respectively different distances from said head for tiltably supporting a piece of work having unfinished surfaces against movement in the direction of the stroke of the broaching tool of said machine, and means in said head co-acting with said pistons for equalizing the resisting forces thereof, said means being adapted to permit relative movement of said pistons during operation of said tool so as to cause the latter to follow the course of the aperture in said work through which said tool is moved.

6. In a broaching machine, a work supporting head having a passage therethrough for receiving a broaching tool, a plurality of shiftable members slidably mounted in said head having end portions protruding from the face thereof in spaced relation to each other and surrounding said passage for engaging a piece of work so as to resist movement thereof with the broaching tool of said machine, and a continuous fluid medium confined in said head and supporting all of said members for equalizing the resisting forces thereof.

7. A broaching head having a passage therethrough for receiving a broaching tool, a plurality of work supporting pistons arranged in circumscribing relation to said passage and guided for relative movement substantially parallel to the axis of said passage, and a closed liquid system floatingly supporting said pistons.

8. A work support for a broaching machine comprising a cylindrical member for receiving a broaching tool, said cylindrical member having an axial passage and having a plurality of apertures therein spaced from each other and arranged around said passage in spaced relation thereto, and an internal passage in communication with the inner end of said apertures and formed between the inner and outer peripheries of said member, pins slidably mounted in each of said apertures sealing the outer end portions thereof, and fluid in said internal passage and in the inner ends of said apertures forming a continuous medium for movably supporting said pins with equalized forces.

CARL J. HALBORG.